(12) United States Patent
Cook et al.

(10) Patent No.: US 11,590,841 B2
(45) Date of Patent: Feb. 28, 2023

(54) ELECTRIC AXLE ASSEMBLY (71) Applicant: Dana Heavy Vehicle Systems Group, LLC, Maumee, OH (US)

(72) Inventors: Michael D. Cook, Holland, OH (US); Darren J. Ziskovsky, Bowling Green, OH (US)

(73) Assignee: Dana Heavy Vehicle Systems Group, LLC, Maumee, OH (US)

( * ) Notice: Subject to any disclaimer, the term of this patent is extended or adjusted under 35 U.S.C. 154(b) by 0 days.

(21) Appl. No.: 17/645,228

(22) Filed: Dec. 20, 2021

(65) Prior Publication Data
US 2022/0111727 A1 Apr. 14, 2022

Related U.S. Application Data (63) Continuation of application No. 16/843,140, filed on Apr. 8, 2020, now Pat. No. 11,254,205.

(60) Provisional application No. 62/832,367, filed on Apr. 11, 2019.

(51) Int. Cl.
| B60K 17/12 | (2006.01) |
| B60K 17/02 | (2006.01) |
| B60K 17/16 | (2006.01) |
| B60K 1/02  | (2006.01) |
| H02K 51/00 | (2006.01) |

(52) U.S. Cl.
CPC .............. *B60K 17/12* (2013.01); *B60K 17/02* (2013.01); *B60K 17/16* (2013.01); *H02K 51/00* (2013.01); *B60Y 2200/91* (2013.01)

(58) Field of Classification Search
CPC ........ B60K 17/12; B60K 17/02; B60K 17/16; B60K 17/165; B60K 17/346; F16H 48/34; F16H 3/72; F16H 37/08; B60Y 2200/91
See application file for complete search history.

(56) References Cited

U.S. PATENT DOCUMENTS

| 6,558,283 | B1 | 5/2003 | Schnelle |
| 6,811,508 | B2 | 11/2004 | Tumback |
| 6,962,545 | B2 | 11/2005 | Larkin |
| 7,140,461 | B2 | 11/2006 | Morrow |
| 7,150,698 | B2 | 12/2006 | Sakamoto et al. |
| 7,195,573 | B2 | 3/2007 | Bezian et al. |
| 7,803,085 | B2 | 9/2010 | Himmelmann |
| 8,373,375 | B2 | 2/2013 | Romig |
| 8,435,147 | B2 | 5/2013 | Kim et al. |
| 9,102,233 | B2 | 8/2015 | Knoblauch et al. |
| 9,199,527 | B2 * | 12/2015 | Knoblauch ............... B60K 1/02 |

(Continued)

FOREIGN PATENT DOCUMENTS

| GB | 2546813 A * | 8/2017 | ............... B60K 1/00 |
| WO | WO-2018130101 A1 * | 7/2018 | |

OTHER PUBLICATIONS

Li (WO2018/130101A1, Jul. 2018)—machine translation.*

*Primary Examiner* — Tinh Dang
(74) *Attorney, Agent, or Firm* — McCoy Russell LLP (57) ABSTRACT

An electric axle assembly having dual motors and dual disconnects allowing for selectably disconnecting either one of the motors so that either motor may operate as the primary drive motor. Each of the dual motors is coupled to a layshaft, and each disconnect is positioned between a gear reduction at the output of the motor and a gear reduction connected to the layshaft. The layshaft is coupled to a differential via a clutch and gear set, the gear set providing a two-speed transmission for power delivered from the layshaft to the differential.

17 Claims, 3 Drawing Sheets

(56) References Cited

U.S. PATENT DOCUMENTS

| | | |
|---|---|---|
| 9,370,991 B2 | 6/2016 | Chung et al. |
| 9,566,852 B2 * | 2/2017 | Knoblauch ........ B60K 23/0808 |
| 9,623,872 B2 | 4/2017 | Zhu et al. |
| 9,630,482 B2 | 4/2017 | Raymond |
| 9,862,374 B2 | 1/2018 | Jerwick |
| 11,318,828 B2 * | 5/2022 | Chopra .................. B60B 35/12 |
| 11,413,948 B2 * | 8/2022 | Houser .................. F16H 63/32 |
| 2014/0335999 A1 * | 11/2014 | Knoblauch .......... B60K 17/356 |
| | | 477/5 |
| 2018/0099561 A1 | 4/2018 | Xu et al. |
| 2019/0077255 A1 | 3/2019 | Misu et al. |
| 2019/0376581 A1 * | 12/2019 | Avery ..................... B60K 1/00 |
| 2021/0008969 A1 * | 1/2021 | Chopra .................. B60B 35/14 |
| 2021/0086611 A1 * | 3/2021 | Inoh ....................... B60K 17/16 |

* cited by examiner

ELECTRIC AXLE ASSEMBLY

CROSS-REFERENCE TO RELATED APPLICATIONS

The present application is a continuation of U.S. Non-Provisional patent application Ser. No. 16/843,140, entitled "ELECTRIC AXLE ASSEMBLY", and filed on Apr. 8, 2020. U.S. Non-Provisional application Ser. No. 16/843,140 claims priority to U.S. Provisional Application No. 62/832,367, entitled "ELECTRIC AXLE ASSEMBLY", and filed on Apr. 11, 2019. The entire contents of each of the above-listed applications are hereby incorporated by reference for all purposes.

FIELD

The invention relates to an electric axle assembly, and more particularly, to an electric axle assembly having dual electric motor generators.

BACKGROUND AND SUMMARY

Electric vehicles (EVs) typically use an electric motor as its primary drive motor or source of propulsion. The electric motor converts electrical energy (electrical power usually expressed in kilowatts (kW)) into power to rotate the vehicle wheels. The electric motor may also operate as a generator to convert rotation of the wheels into electrical energy. Thus, as well understood, the electric motor may sometimes be referred to as an electric motor, or a power supply, or an electric generator, or an electric motor generator. The electric motor can be of different types, with AC motors being the most common. Vehicle batteries store the electricity required to run the EV, with the capacity (range) of the batteries usually expressed in kWh (kilowatt-hours). An inverter converts electric direct current (DC) from the batteries into alternating current (AC) used by the AC motor to spin a rotor of the motor, the rotor linked to other parts of the vehicle drivetrain to send power to the wheels. EVs may use a single-speed transmission or a single-speed gear set to supply power to the wheels, usually through a differential interconnected with half-shafts, or other axle components extending to each wheel. However, other EV designs incorporate a multi-speed transmission in order to improve operating characteristics at various vehicle speeds and conditions. Still other EV designs may incorporate more than one electric motor.

For example, dual electric motors may be used. In some applications using dual electric motors, one motor may be optimized for power and the other may be optimized for range. Dual motors may, for example, be used for redundancy, so that the vehicle may operate if one of the motors become inoperative or damaged. When an electric vehicle includes two electric motor generators it is typical that one of the electric motor generators acts as a primary source of propulsion. Having one electric motor generator act as the primary source of propulsion causes the primary electric motor generator to wear more quickly than the second electric motor generator. It would be desirable, therefore, to be able to select which electric motor generator acts as the primary source of propulsion in order to distribute wear to evenly to the electric motor generators in an electric axle.

Further, an electric axle assembly having a multi-speed transmission, such as for example a two-speed transmission, and/or a dual motor configuration, has increased component complexity, increased space requirements for packaging the components within the vehicle system, and increased weight due to the additional number of components. Weight distribution of the electric axle assembly within the vehicle system is another factor, where a lower center of mass within the vehicle and/or particular distributions fore and aft or in relation to opposite wheels of the vehicle may be of additional importance for improved vehicle operating performance.

To address at least some of the aforementioned and other problems, embodiments for an electric axle assembly are provided. According to a first aspect of the disclosure is an electric axle assembly comprising a first motor generator having a first disconnect mechanism disposed between a first gear reduction at the output of the first motor generator and a second gear reduction connected to a layshaft, the layshaft operably coupled to a differential via a clutch assembly, the clutch assembly disposed on the layshaft and engaged with a gear assembly, with the gear assembly being operatively connected to the differential, and a second motor generator having a third gear reduction at the output of the second motor generator and a fourth gear reduction connected to the layshaft, wherein the first disconnect mechanism is adapted to permit the first motor generator to be selectably operably disconnected from the layshaft while the second motor generator remains operably connected to the layshaft.

In one aspect, the electric axle assembly further comprises a second disconnect mechanism disposed between the third gear reduction at the output of the second motor generator and the fourth gear reduction connected to the layshaft, wherein the second disconnect mechanism is adapted to permit the second motor generator to be selectably operably disconnected from the layshaft.

In one aspect, the first disconnect mechanism is communicably coupled to a controller, and the controller is adapted to selectably disconnect the first motor generator via the first disconnect mechanism when less than a predetermined level of power is required by the vehicle.

In one aspect, the first disconnect and the second disconnect are adapted to permit engaging either one of the first motor generator or the second motor generator as a primary drive motor based on a time at load for the first motor generator and a time at load for the second motor generator.

In one aspect, the first disconnect and the second disconnect are adapted to permit alternating between the first motor generator and the second motor generator as primary drive motors during operation of the vehicle to extend the life of each driving motor.

In one aspect, the first disconnect and the second disconnect are adapted to permit engaging both the first motor generator and the second motor generator at the same time so that both the first motor generator and the second motor generator provide power to the differential for a predetermined duration, after which a controller selectably operably disconnects either the first motor generator or the second motor generator from the layshaft, with selection as to which motor generator to disconnect based on algorithms used by the controller.

In one aspect, the first disconnect and the second disconnect are adapted to permit spinning up an operably disconnected motor generator to operably match a rotational speed of the layshaft so as to operably reconnect the formerly disconnected motor generator.

In one aspect, the first gear reduction includes a first gear that rotates with an output shaft of the first motor generator and a second gear that rotates with a first intermediate shaft, the second gear reduction includes a third gear that rotates with the first intermediate shaft and a fourth gear that rotates with the layshaft, the third gear reduction includes a seventh gear that rotates with a second intermediate shaft and the fourth gear that rotates with the layshaft, and the fourth gear reduction that includes a fifth gear that rotates with an output shaft of the second motor generator and a sixth gear that rotates with the second intermediate shaft.

In one aspect, the clutch assembly disposed on the layshaft and operatively connected to the differential is adapted to permit operation of the electric axle assembly at one of two different rotational speeds.

In one aspect, an output shaft of the first motor generator, the layshaft, and an output shaft of the second motor generator are in a parallel alignment with one another, the output shaft of the second motor generator is hollow, and at least a portion of an axle shaft operatively coupled to the differential extends through the hollow output shaft of the second motor generator.

In another aspect, an electric axle assembly in a vehicle comprises: a first motor generator; a first motor shaft operatively coupled to the first motor generator; a first gear reduction connected to the motor shaft; a first intermediate shaft connected to the first gear reduction; a first disconnect mechanism provided in the first intermediate shaft to selectively disconnect a first portion and a second portion of the first intermediate shaft; a second gear reduction connected to the first intermediate shaft; a second motor generator; a second motor shaft operatively coupled to the second motor generator; a third gear reduction connected to the second motor shaft; a second intermediate shaft connected to the third gear reduction; a fourth gear reduction connected to the second intermediate shaft; a layshaft connected to the second gear reduction and the fourth gear reduction; and a differential operatively connected to the layshaft.

In one aspect, the electric axle assembly further comprises a second disconnect mechanism provided in the second intermediate shaft to selectively disconnect a first portion and a second portion of the second intermediate shaft.

In one aspect, the electric axle assembly further comprises a clutch assembly disposed on the layshaft, the clutch assembly engaged with a gear assembly and the gear assembly being operatively connected to the differential.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The accompanying drawings are incorporated herein as part of the specification. The drawings described herein illustrate embodiments of the presently disclosed subject matter, and are illustrative of selected principles and teachings of the present disclosure. However, the drawings do not illustrate all possible implementations of the presently disclosed subject matter, and are not intended to limit the scope of the present disclosure in any way.

Similar reference numerals may have been used in different figures to denote similar components. FIG. 3 is shown with components in proportional size with one another, according to some embodiments.

DETAILED DESCRIPTION OF THE INVENTION

It is to be understood that the invention may assume various alternative orientations and step sequences, except where expressly specified to the contrary. It is also to be understood that the assemblies, devices, and methods illustrated in the attached drawings, and described in the following specification are simply exemplary embodiments of the inventive concepts. Hence, specific dimensions, directions, or other physical characteristics relating to the embodiments disclosed are not to be considered as limiting, unless expressly stated otherwise.

Figure 1:
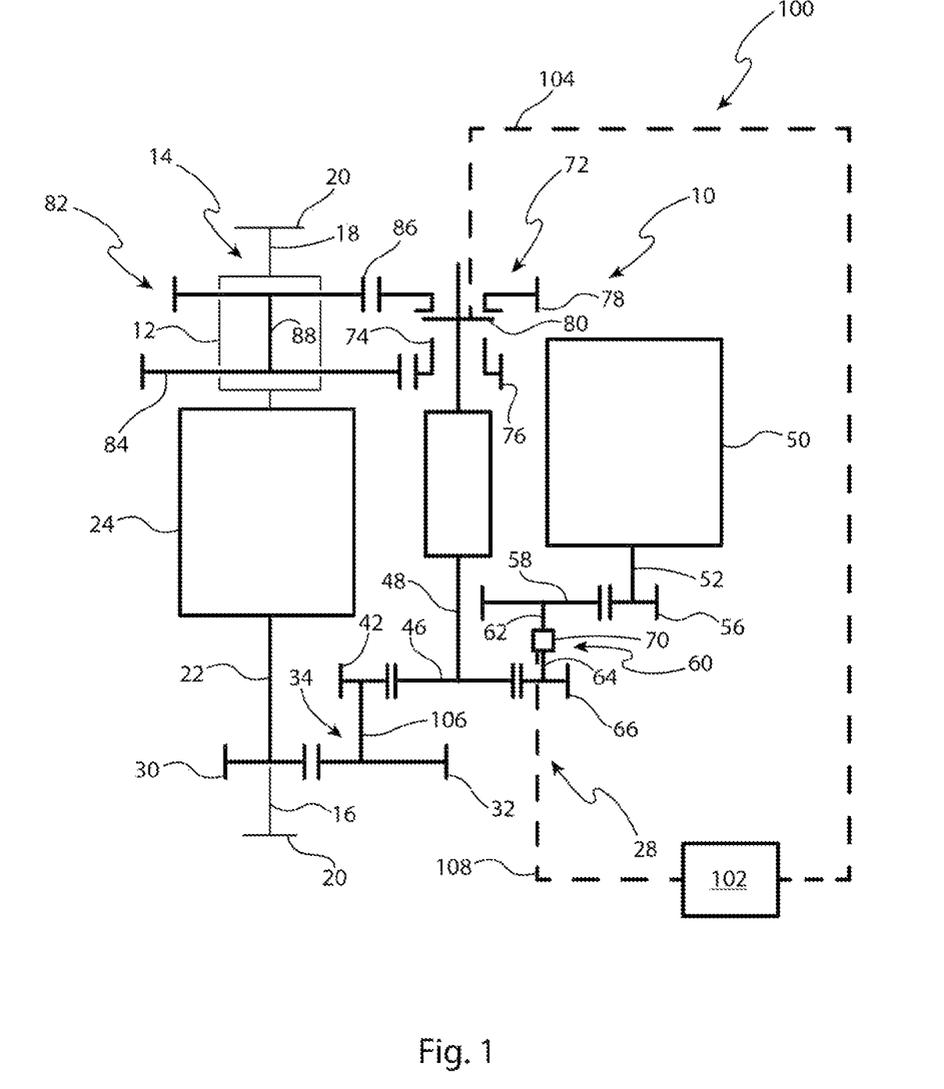
FIG. 1 is a schematic view of an electric axle assembly in accordance with an embodiment.

As an overview, FIG. 1 is a schematic of an electric axle assembly and system 100, according to some embodiments, comprising two electric drive motors, with each motor connected to a common layshaft that is coupled to a differential; and in the system 100, the electric axle assembly 10 includes a disconnect so that one of the two motors may be disengaged. Each of the motors are connected at their output to a gear reduction, and the layshaft common between the two motors includes, as shown, a clutch assembly having two gears. The gears provide two different gear combinations (or speeds) for transmitting power from the layshaft to the differential. And the differential, as shown, is coupled with axle shafts (or half shafts) connectable to respective wheels. A controller 102 is shown, for controlling the clutches and actuators associated with the motor disconnect and/or layshaft clutch assembly.

Figure 2:
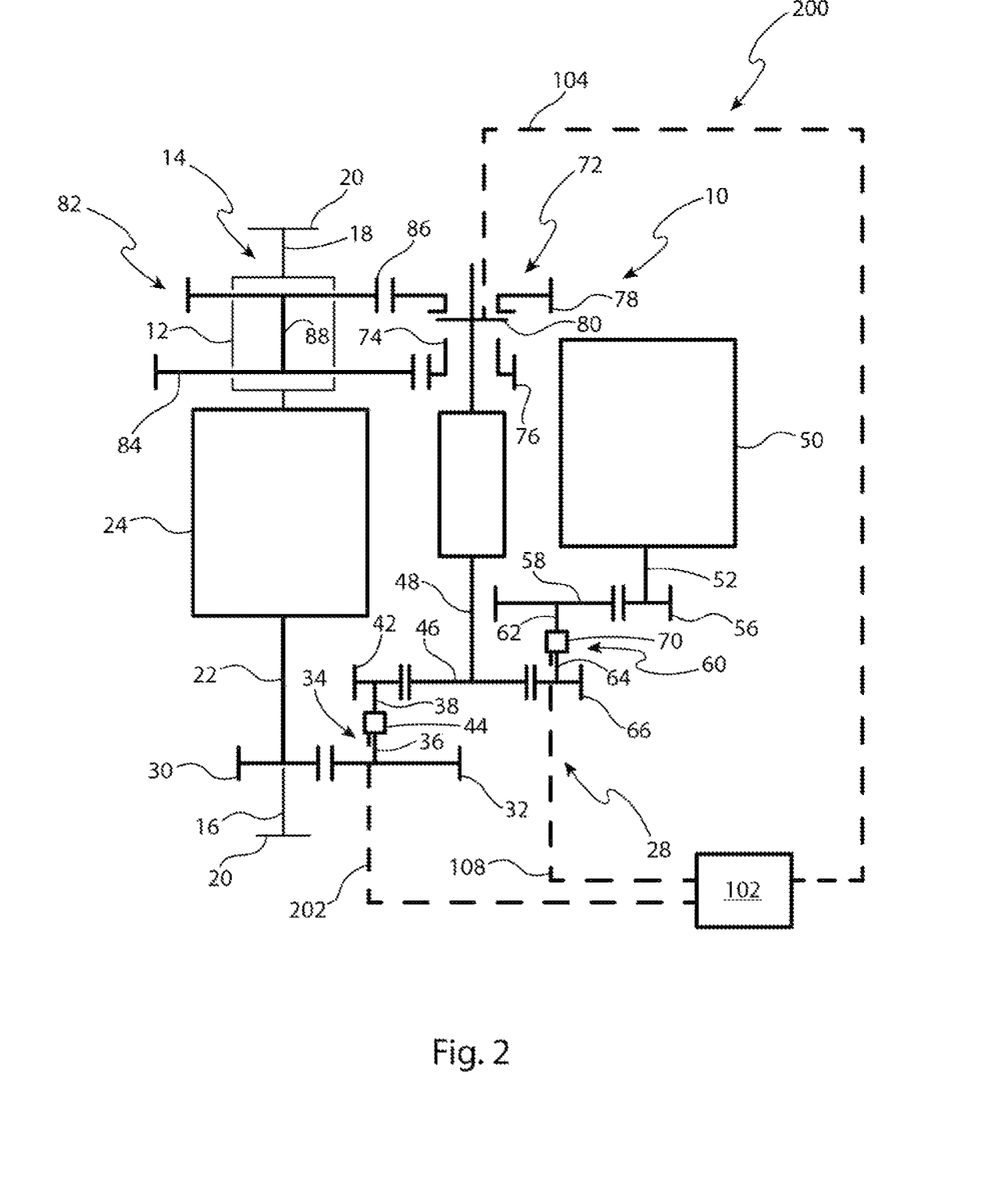
FIG. 2 is a schematic view of an electric axle assembly in accordance with another embodiment.

FIG. 2 is a schematic of an electric axle assembly and system 200, according to some embodiments, comprising the same components as in FIG. 1 except that two disconnects are provided, one for each of the two motors.

Figure 3:
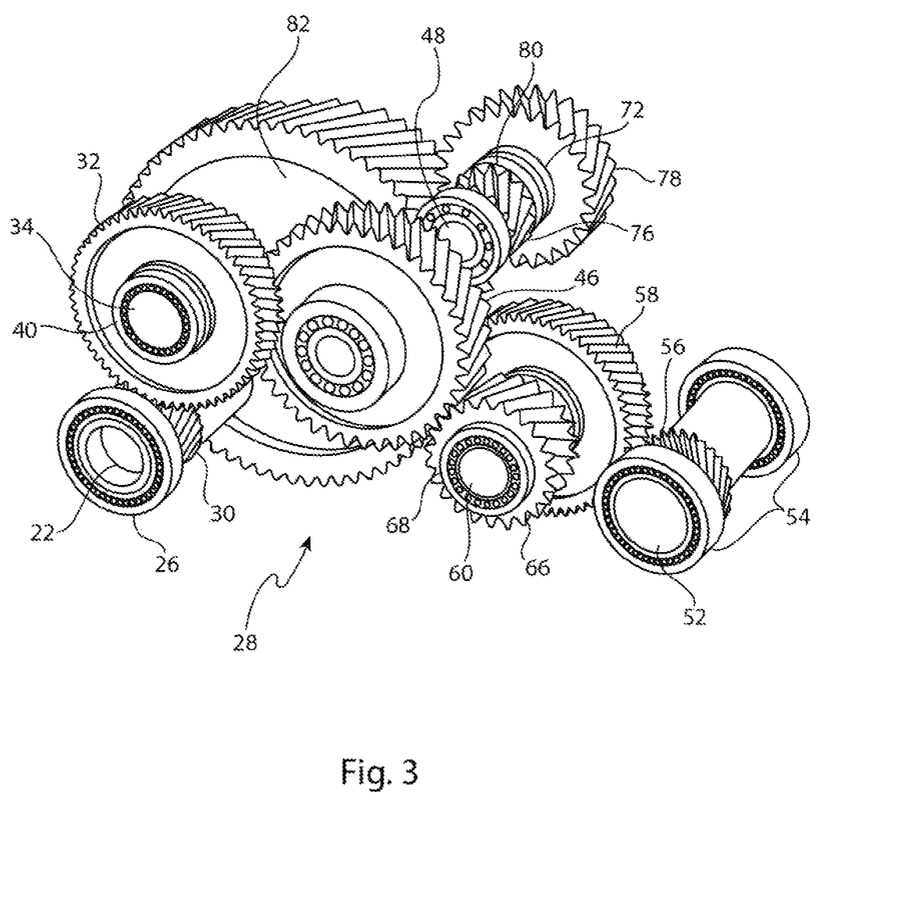
FIG. 3 is a perspective view illustrating portions of the electric axle assembly, according to embodiments.

FIG. 3 provides a perspective view of exemplary gears comprising the electric axle assembly and systems 100, 200. FIG. 3 illustrates a compact, space-saving arrangement and layout of the gears, as well as an arrangement whereby the motor shafts, layshaft, and intermediate shafts are substantially parallel to one another, and the gears are substantially perpendicular to the shafts and parallel (and closely spaced) to one another. Also shown in FIG. 3 is the separation between motor shafts 22 and 52, effectively providing separation (thereby providing improved cooling/thermal management) between motors 24 and 50, respectively.

Generally, the present inventors discovered the described dual electric motor disconnect embodiments for improving drive axle/electric axle assembly/system efficiency, motor and gear train/system cooling, and motor life optimization. More specifically, system efficiency at highway speeds prompted the present inventors to develop various improvements such as the embodiments described herein, which provide for disconnecting either one of two motors, in a compact layout (e.g., taking less space with shafts in parallel and gears closely packed), favorably positioned/arranged (e.g., lower in height with respect to the vehicle drive axle due to the axle shaft extending through the hollow shaft 22 of the motor 24), higher performance (e.g., two speed transmission and dual motors) and weight reduced (due to compact layout/size) electric axle assembly. The embodiments described herein for an electric axle assembly having dual motors, allow for driving with one primary motor and allow the motor/vehicle controller to switch between primary motors to allow each motor to achieve the same theoretical wear (damage) instead of having one motor operating at near full capacity, for example, 80% of the time.

In FIG. 1, the motor 50 is shown as having a disconnect 70 between the first gear reduction (or gear reduction 56, 58) and the second gear reduction (or gear reduction 66, 46) that ties into the layshaft 48. The motor 50 would be (in intended operation) disconnected at modes of operation where less than 200 kW of power is required by the vehicle. Based on a duty cycle for the vehicle, less than approximately 20 to 30% of the operating time requires greater than 200 kW of power. Therefore, in typically anticipated operating conditions, the primary motor 24 would be in operation 100% of the time, and the motor 50 would be in operation only 20-30% of the time. By disconnecting the motor 50, motor wear (damage) is avoided and drag (due to the spinning mass) is reduced by idling the rotor and reduction gears connected to the output shaft of the idled motor.

In FIG. 2, a (second) disconnect 44 is shown between the first reduction gear (or gear reduction 30, 32) from the motor 24 and the second reduction (gear reduction 42, 46) that ties into the layshaft 48. By having disconnects (such as disconnects 44 and 70) attached to both motor positions, the primary motor may be selected based on time at load (for each separate motor) and may be used to alternate between primary motors during operation to extend the life of each driving motor.

The present inventors discovered further advantages. For example, from a (vehicle) stop, it is likely that both motors will be engaged to allow the vehicle to get up to speed more rapidly, and either motor may be disconnected at that point based on algorithms in the controller, such as controller 102. As the embodiments described further provide, an ability to spin the electric motor up to speed (from idle to a target RPM) with zero torque command allows speed matching to re-engage the motor if more power is needed without having to need a torque interrupt as well. Operation in a zero torque mode allows the electric motor to be fully fluxed and ready to begin rotation when a speed command or torque command is given. By having disconnects (such as disconnects 44 and 70) attached to both motor positions, either motor may be idled and then efficiently brought back up to speed so as to re-engage with the layshaft and thereby supply power to the (differential and) drive shafts/axle shafts (and wheels connectable thereto).

Embodiments of an electric axle assembly 10 are illustrated in FIGS. 1-3. The electric axle assembly 10 may be utilized as an electric drive axle. The electric axle assembly 10 may have applications in commercial vehicles, both light duty and heavy duty vehicles, and for passenger, off-highway, and sport utility vehicles. Additionally, the electric axle assembly 10 may be adapted for use in front and/or rear driving axles, and steerable and non-steerable axles. It is to be understood that the electric axle assembly 10 may also have industrial, locomotive, military, agricultural, and aerospace applications. Moreover, various inventive aspects described herein in the context of an electric axle assembly may separable.

In an embodiment, the electric axle assembly 10 is in mechanical communication with a differential 12. In one embodiment, the electric axle assembly 10 comprises the differential 12. The differential 12 may be operatively attached to an axle 14. The axle 14 may comprise a first axle shaft 16 and a second axle shaft 18. Each axle shaft 16, 18 may be attached to a respective wheel 20.

The first axle shaft 16 preferably extends through a hollow motor shaft 22. The hollow motor shaft 22 extends from and is operatively coupled to an electric motor generator 24. As illustrated in FIG. 1, the axle 14 and the first electric motor generator 24 may be in a parallel configuration. As used herein, the phrase "parallel configuration" may refer to the parallel arrangement and orientation of the power output shaft (motor shaft) 22 in relation to the axles (half shafts) 14, 18.

As shown in FIG. 3, the hollow motor shaft 22 is supported by bearings 26. Preferably, the bearings supporting motor shaft 22 comprise a first and a second bearing. A housing (not depicted) may surround at least a portion of the first electric motor generator and the hollow motor shaft. The housing may be constructed to further contain and circulate a lubricant including, but not limited to, an oil.

The hollow motor shaft 22 may be operatively connected to a gear train 28. The gear train 28 may be used to provide input to and output from the electric motor generator 24. The gear train 28 may comprise helical gears (as illustrated in FIG. 3).

In an embodiment, the gear train 28 comprises a gear 30 operatively attached to and rotating with the hollow motor shaft 22. The gear 30 and a gear 32 are engaged and rotate together. Preferably, the gear 30 and the gear 32 provide a gear reduction (referred herein as "gear reduction 30, 32").

The gear 32 is operatively attached to and rotates with an intermediate shaft 34. In FIG. 1, the intermediate shaft 34 comprises a shaft 106 or connecting member 106 or simply a fixed connected relationship 106 between gear 32 and gear 42. Gear 32 and gear 42, as shown, are rotatably fixed to one another such that both gears 32 and 42 rotate together with one another at the same rate or RPM.

In the embodiment shown in FIG. 2, the first intermediate shaft 34 preferably comprises a first portion 36 and a second portion 38. The first portion 36 is attached to the gear 32 and supported for rotation by bearings 40, which are illustrated in FIG. 3. The first portion 36 and the gear 32 rotate together. The second portion 38 is attached to the gear 42. The second portion 38 and the gear 42 rotate together. In some embodiments, the second portion 38 is supported for rotation by bearings (not depicted).

For the embodiment shown in FIG. 2, a disconnect mechanism 44 is provided in the intermediate shaft 34 to selectively disconnect the first portion 36 and the second portion 38. When the disconnect mechanism 44 is activated (so as to disconnect the gear 32 from the gear 42), the (rotational) power provided by the motor generator 24 is not communicated to the second portion 38 of the intermediate shaft 34. When the disconnect mechanism 44 is not activated (so as to leave the gear 32 connected to the gear 42), the power provided by the motor generator 24 is communicated from the first portion 36 to the second portion 38 of the intermediate shaft 34.

The gear 42 is engaged and rotates with a gear 46. The gear 46 is operatively attached to and rotates with a layshaft 48. Preferably, the gear 42 and the gear 46 provide a gear reduction 42, 46. Thus, in some embodiments, the disconnect mechanism 44 is provided between the gear reduction 30, 32 and the gear reduction 42, 46. Said another way, the disconnect mechanism 44 is disposed between the gear reduction 30, 32 at the output of the motor generator 24 and the gear reduction 42, 46 connected to the layshaft 48.

The electric axle assembly 10 also comprises a second electric motor generator, motor generator 50. A motor shaft or output shaft 52 is operatively coupled to the motor generator 50. The motor shaft 52 is supported by bearings 54, which are illustrated in FIG. 3. The bearings 54 preferably comprise a first and second bearing.

The motor shaft 52 may be operatively connected to the gear train 28 way of a gear 56 operatively attached to and rotating with the motor shaft 52. The gear 56 and a gear 58 are engaged and rotate together. Preferably, the gear 56 and the gear 58 provide a gear reduction 56, 58.

The gear 58 is operatively attached to and rotates with an intermediate shaft 60. Preferably, the intermediate shaft 60 comprises a first portion 62 and a second portion 64. The first portion 62 is attached to the gear 58 and may be supported for rotation by bearings (not depicted). The first portion 62 and the gear 58 rotate together. The second portion 64 is attached to a gear 66. The second portion 64 and the gear 66 rotate together. Preferably, the second portion 64 is supported for rotation by bearings 68, which are illustrated in FIG. 3.

As shown in both FIGS. 1 and 2, a disconnect mechanism 70 is provided in the intermediate shaft 60 to selectively disconnect the first portion 62 and the second portion 64. When the second disconnect mechanism 70 is activated, the (rotational) power provided (transmitted) by the motor generator 50 is not communicated to the second portion 64 of the intermediate shaft 60. When the disconnect mechanism 70 is not activated, the power provided by the motor generator 50 is communicated from the first portion 62 to the second portion 64 of the intermediate shaft 60.

The gear 66 is engaged and rotates with the gear 46. Preferably, the gear 66 and the gear 46 provide a gear reduction 66, 46. Thus, in some embodiments, the disconnect mechanism 70 is provided between the gear reduction 56, 58 and the gear reduction 66, 46. Put another way, the disconnect mechanism 70 is disposed between the gear reduction 56, 58 at the output of the motor generator 50 and the gear reduction 66, 46 connected to the layshaft 48.

A clutch assembly 72 is disposed about a portion of the layshaft 48. In preferred embodiments, the clutch assembly 72 enables the electric axle 10 to exhibit two speeds. However, in some embodiments, the clutch assembly may provide engagement and disengagement between the layshaft 48 and a drive gear associated with the differential 12.

Preferably, and as shown in FIGS. 1 and 2, the clutch assembly 72 comprises a clutch gear assembly 74. The clutch gear assembly 74 comprises a low gear 76 and a high gear 78. A clutch 80 is utilized to selectively and operatively engage the low gear 76 or the high gear 78 with the layshaft 48. In some embodiments, the clutch 80 may be of the sliding collar, electromagnetic, or face variety. In other embodiments, the clutch 80 is another type of torque transferring disconnection mechanism.

The clutch assembly 72 is engaged with a gear assembly 82. More particularly, the low gear 76 is engaged and rotates with a first gear 84 of the gear assembly 82 and the high gear 78 is engaged and rotates with a second gear 86 of the gear assembly 82. Engagement of the low gear 76 and the first gear 84 of the gear assembly 82 provides a first gear ratio when the clutch 80 engages the low gear 76 with the layshaft 48. Engagement of the high gear 78 and the second gear 86 of the gear assembly 82 provides a second gear ratio when the clutch 80 engages the high gear 78 with the layshaft 48.

The first gear 84 and the second gear 86 of the gear assembly 82 are mechanically coupled together via a shaft 88 or another member and rotate with each other. The gear assembly 82 may be operatively connected to the differential 12. In some embodiments, the gear assembly 82 may be mechanically coupled to the differential 12. The gear assembly 82 is utilized to (transmit) transfer (rotational) power to and from the differential 12.

Under certain conditions, it may be desirable for the motor generator 24 and the motor generator 50 to each provide power to the differential 12. However, under other conditions and to operate in the most efficient manner, it may be preferred that the motor generator 24 or the motor generator 50 act as the primary driving motor with the remaining motor generator being at a 0 rpm (idle) condition or without providing any additional power needed to the differential 12. Providing a disconnect mechanism 44, 70 for each electric motor generator 24, 50 allows the motor generator 24 and the motor generator 50 to each act as the primary driving motor or be taken to a 0 rpm condition as desired. For example, if the motor generator 24 is acting as the primary or only driving motor and a predetermined load or time has been achieved, the disconnect mechanism 44 may be activated to prevent the motor generator 24 from communicating power to the differential 12 and the motor generator 50 may be selected to be the primary or only driving motor. After the disconnect mechanism 44 has been activated and the motor generator 24 is no longer communicating power to the differential 12, the motor generator 24 can be taken to a 0 rpm condition. In this embodiment, with the disconnect mechanism 70 activated, the motor generator 50 can be activated from a 0 rpm condition or another condition to permit the motor shaft 52 to achieve a desirable speed before the second motor generator 50 communicates power to the differential 12. Alternatively, if the motor generator 24 is acting as the primary or only driving motor and additional power is required, utilizing the disconnect mechanism 70 enables the motor generator 50 to be activated and speed matching to occur before the motor generator 50 communicates power to the differential 12.

Also as shown in FIGS. 1 and 2, a controller 102 is provided. In FIG. 1, the system 100 comprises a controller 102 for controlling actuation/activation/sensing/movement of the disconnect 70 and/or clutch assembly 72 (or clutch 80) via communicative couplings 108 (disconnect 70) and 104 (clutch 80). In FIG. 2, the system 200 comprises a controller 102 for controlling actuation/activation/sensing/movement of the disconnects 44 and 70 and/or clutch assembly 72 (or clutch 80) via communicative couplings 108 (disconnect 70), 202 (disconnect 44), and 104 (clutch 80). Disconnects 44, 70 may comprise clutches and actuators communicably coupled to the controller 102. In response to inputs from the disconnects 44, 70, the controller 102 may send a signal causing one or more of the disconnects to activate (or change state). In one embodiment, the disconnect mechanisms 44, 70 are communicably coupled to a controller 102, and the controller 102 is adapted to selectably disconnect one of the motor generators 24, 50 via the corresponding disconnect mechanism 44, 70 when less than a predetermined level of power is required by the vehicle. The predetermined level of power may be, for example, 200 kW. In one embodiment, the disconnect 44 and the disconnect 70 are adapted to permit engaging both the motor generator 24 and the motor generator 50 at the same time so that both the motor generator 24 and the motor generator 50 provide power to the differential 12 for a predetermined duration, after which the controller 102 selectably operably disconnects either the motor generator 24 or the motor generator 50 from the layshaft 48, with selection as to which motor generator to disconnect based on algorithms used by the controller 102.

As describe in detail herein, in one embodiment, an electric axle assembly for a vehicle includes a first motor generator having a first disconnect mechanism disposed between a first gear reduction at the output of the first motor generator and a second gear reduction connected to a layshaft, the layshaft operably coupled to a differential via a clutch assembly, the clutch assembly disposed on the layshaft and engaged with a gear assembly, with the gear assembly being operatively connected to the differential, and a second motor generator having a third gear reduction at the output of the second motor generator and a fourth gear reduction connected to the layshaft, wherein the first disconnect mechanism is adapted to permit the first motor generator to be selectably operably disconnected from the layshaft while the second motor generator remains operably connected to the layshaft.

In one aspect, the electric axle assembly further comprises a second disconnect mechanism disposed between the third gear reduction at the output of the second motor generator and the fourth gear reduction connected to the layshaft, wherein the second disconnect mechanism is adapted to permit the second motor generator to be selectably operably disconnected from the layshaft.

In one aspect, the first disconnect mechanism is communicably coupled to a controller, and the controller is adapted to selectably disconnect the first motor generator via the first disconnect mechanism when less than a predetermined level of power is required by the vehicle.

In one aspect, the first disconnect and the second disconnect are adapted to permit engaging either one of the first motor generator or the second motor generator as a primary drive motor based on a time at load for the first motor generator and a time at load for the second motor generator.

In one aspect, the first disconnect and the second disconnect are adapted to permit alternating between the first motor generator and the second motor generator as primary drive motors during operation of the vehicle to extend the life of each driving motor.

In one aspect, the first disconnect and the second disconnect are adapted to permit engaging both the first motor generator and the second motor generator at the same time so that both the first motor generator and the second motor generator provide power to the differential for a predetermined duration, after which a controller selectably operably disconnects either the first motor generator or the second motor generator from the layshaft, with selection as to which motor generator to disconnect based on algorithms used by the controller.

In one aspect, the first disconnect and the second disconnect are adapted to permit spinning up an operably disconnected motor generator to operably match a rotational speed of the layshaft so as to operably reconnect the formerly disconnected motor generator.

In one aspect, the first gear reduction includes a first gear that rotates with an output shaft of the first motor generator and a second gear that rotates with a first intermediate shaft, the second gear reduction includes a third gear that rotates with the first intermediate shaft and a fourth gear that rotates with the layshaft, the third gear reduction includes a seventh gear that rotates with a second intermediate shaft and the fourth gear that rotates with the layshaft, and the fourth gear reduction that include a fifth gear that rotates with an output shaft of the second motor generator and a sixth gear that rotates with the second intermediate shaft.

In one aspect, the clutch assembly disposed on the layshaft and operatively connected to the differential is adapted to permit operation of the electric axle assembly at one of two different rotational speeds.

In one aspect, an output shaft of the first motor generator, the layshaft, and an output shaft of the second motor generator are in a parallel alignment with one another, the output shaft of the second motor generator is hollow, and at least a portion of an axle shaft operatively coupled to the differential extends through the hollow output shaft of the second motor generator.

In another embodiment, an electric axle assembly in a vehicle comprises: a first motor generator; a first motor shaft operatively coupled to the first motor generator; a first gear reduction connected to the motor shaft; a first intermediate shaft connected to the first gear reduction; a first disconnect mechanism provided in the first intermediate shaft to selectively disconnect a first portion and a second portion of the first intermediate shaft; a second gear reduction connected to the first intermediate shaft; a second motor generator; a second motor shaft operatively coupled to the second motor generator; a third gear reduction connected to the second motor shaft; a second intermediate shaft connected to the third gear reduction; a fourth gear reduction connected to the second intermediate shaft; a layshaft connected to the second gear reduction and the fourth gear reduction; and a differential operatively connected to the layshaft.

In one aspect, the electric axle assembly further comprises a second disconnect mechanism provided in the second intermediate shaft to selectively disconnect a first portion and a second portion of the second intermediate shaft.

In one aspect, the electric axle assembly further comprises a clutch assembly disposed on the layshaft, the clutch assembly engaged with a gear assembly and the gear assembly being operatively connected to the differential.

FIG. 3 shows an example configuration with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Certain adaptations and modifications of the described embodiments can be made. Therefore, the above discussed embodiments are considered to be illustrative and not restrictive. The present disclosure is not to be limited in scope by the specific embodiments described herein. Further example embodiments may also include all of the steps, features, compositions and compounds referred to or indicated in this description, individually or collectively and any and all combinations or any two or more of the steps or features.

Throughout this document, the use of the word "a" or "an" when used in conjunction with the term "comprising" in the claims and/or the specification may mean "one", but it is also consistent with the meaning of "one or more", "at least one", and "one or more than one". Similarly, the word "another" may mean at least a second or more. The words "comprising" (and any form of comprising, such as "comprise' and comprises), "having" (and any form of having, such as "have" and "has"), "including" (and any form of including, such as "include" and "includes") or "containing" (and any form of containing, such as "contain" and "contains"), are inclusive or open-ended and do not exclude additional, unrecited elements or process steps.

In the present specification and in the appended claims, various terminology which is directional, geometrical and/or spatial in nature such as "longitudinal", "horizontal", "front", "forward", "backward", "back", "rear", "upwardly", "downwardly", etc. is used. It is to be understood that such terminology is used for ease of description and in a relative sense only and is not to be taken in any way as specifying an absolute direction or orientation.

The embodiments described herein may include one or more range of values (for example, size, displacement and field strength etc.). A range of values will be understood to include all values within the range, including the values defining the range, and values adjacent to the range that lead to the same or substantially the same outcome as the values immediately adjacent to that value which defines the boundary to the range. For example, a person skilled in the field will understand that a 10% variation in upper or lower limits of a range can be totally appropriate and is encompassed by the disclosure. More particularly, the variation in upper or lower limits of a range will be 5% or as is commonly recognized in the art, whichever is greater.

Throughout this specification relative language such as the words 'about' and 'approximately' are used. This language seeks to incorporate at least 10% variability to the specified number or range. That variability may be plus 10% or negative 10% of the particular number specified.

The foregoing description is considered as illustrative only of the principles of the invention. Further, since numerous modifications and changes will readily occur to those skilled in the art, it is not desired to limit the invention to the exact construction and processes shown and described herein. Accordingly, all suitable modifications and equivalents may be considered as falling within the scope of the invention as defined by the claims which follow.

What is claimed is:

1. An electric drive axle in an electric vehicle, comprising:
   a first motor rotationally coupled to a first intermediate shaft with a first gear positioned thereon that is coupled to a layshaft gear on a layshaft;
   a second motor rotationally coupled to a second intermediate shaft with a second gear positioned thereon that is coupled to the layshaft gear; and
   a first disconnect mechanism positioned between the first motor and the layshaft and configured to disconnect the first motor from the layshaft; and
   a controller configured to:
      speed match the first motor and the second motor; and
      operate the first disconnect mechanism to connect the first motor to the layshaft when the first motor achieves a threshold speed.

2. The electric drive axle of claim 1, wherein the first motor, the second motor, and the layshaft are positioned parallel to one another.

3. The electric drive axle of claim 1, further comprising a two-speed clutch assembly coupled to the layshaft and a differential.

4. The electric drive axle of claim 3, wherein the differential is positioned on an axial side of the first motor that is opposite to a motor shaft of the first motor.

5. The electric drive axle of claim 3, wherein the two-speed clutch assembly includes a sliding collar clutch or an electromagnetic clutch.

6. The electric drive axle of claim 1, further comprising a second disconnect mechanism positioned between the second motor and the layshaft and configured to disconnect the second motor from the layshaft.

7. The electric drive axle of claim 1, further comprising a controller configured to operate the first disconnect mechanism to disconnect the first motor from the layshaft when a requested vehicle power level falls below a threshold value.

8. The electric drive axle of claim 1, wherein the first motor and the second motor are motor-generators.

9. A multi-motor electric vehicle system, comprising:
   a first motor generator and a second motor generator coupled to a layshaft;
   a first disconnect mechanism configured to selectively decouple the first motor generator from the layshaft;
   a second disconnect mechanism configured to selectively decouple the second motor generator from the layshaft;
   a differential coupled to the layshaft;
   an axle coupled to the differential; and
   a clutch assembly coupled to the layshaft and a differential, and configured to selectively operably engage a high gear and a low gear with the differential.

10. The multi-motor electric vehicle system of claim 9, wherein the multi-motor electric vehicle system is an electric axle.

11. The multi-motor electric vehicle system of claim 9, wherein the clutch assembly includes a sliding collar clutch.

12. The multi-motor electric vehicle system of claim 9, further comprising a controller configured to, when a desired condition is met, operate the first disconnect mechanism to decouple the first motor generator from the layshaft and bring the first motor generator to a zero speed condition.

13. The multi-motor electric vehicle system of claim 9, a controller configured to speed match the first motor generator with the second motor generator and then operate at least one of the first disconnect mechanism and the second disconnect mechanism to transfer power from the first and second motor generators to the layshaft.

14. The multi-motor electric vehicle system of claim 9, wherein the first motor generator is coupled to the layshaft via a first intermediate shaft that includes a first gear directly coupled to a layshaft gear.

15. A multi-motor electric vehicle system, comprising:
   a first motor generator and a second motor generator coupled to a layshaft;
   a first disconnect mechanism configured to selectively decouple the first motor generator from the layshaft;
   a second disconnect mechanism configured to selectively decouple the second motor generator from the layshaft;
   a differential coupled to the layshaft; and
   an axle coupled to the differential;
   wherein the first motor generator is coupled to the layshaft via a first intermediate shaft that includes a first gear directly coupled to a layshaft gear; and wherein the second motor generator is coupled to the layshaft via a second intermediate shaft that includes a second gear directly coupled to the layshaft gear.

16. The multi-motor electric vehicle system of claim 15, wherein the first intermediate shaft includes a third gear coupled to a first motor shaft gear of the first motor generator and the second intermediate shaft includes a fourth gear coupled to a second motor shaft gear of the second motor generator.

17. The multi-motor electric vehicle system of claim 9, wherein the first motor generator, the second motor generator, and the layshaft are parallel to one another.

* * * * *